(12) United States Patent
Sung

(10) Patent No.: US 6,281,742 B1
(45) Date of Patent: Aug. 28, 2001

(54) SUBSTRATE VOLTAGE DETECTION CONTROL CIRCUIT

(75) Inventor: Ha Min Sung, Choongcheongbuk-Do (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/247,530

(22) Filed: Feb. 10, 1999

(30) Foreign Application Priority Data

Nov. 26, 1998 (KR) .................................................. 98-50979

(51) Int. Cl.[7] ........................................................ G05F 1/10
(52) U.S. Cl. ............................................. 327/535; 327/534
(58) Field of Search ..................................... 327/534, 535, 327/536, 537

(56) References Cited

U.S. PATENT DOCUMENTS

| Re. 34,797 | * | 11/1994 | Sato et al. | 327/534 |
|---|---|---|---|---|
| 5,329,168 | * | 7/1994 | Sugibayashi et al. | 327/535 |
| 5,602,506 | * | 2/1997 | Kim et al. | 327/535 |
| 5,640,118 | * | 6/1997 | Drouot | 327/306 |
| 5,744,997 | * | 4/1998 | Kang et al. | 327/537 |
| 5,920,226 | * | 7/1999 | Mimura | 327/537 |
| 5,952,872 | * | 9/1999 | Hur | 327/535 |

\* cited by examiner

Primary Examiner—Terry D. Cunningham

(57) ABSTRACT

A substrate voltage detection control circuit is disclosed. The circuit includes a substrate voltage detector detecting a substrate voltage from a charge pump, and a control circuit separately operating the substrate voltage detector in accordance with an operation mode of a chip, for thereby sensitively reacting to the variation of the substrate voltage by turning on a substrate voltage detector in the active mode.

12 Claims, 4 Drawing Sheets

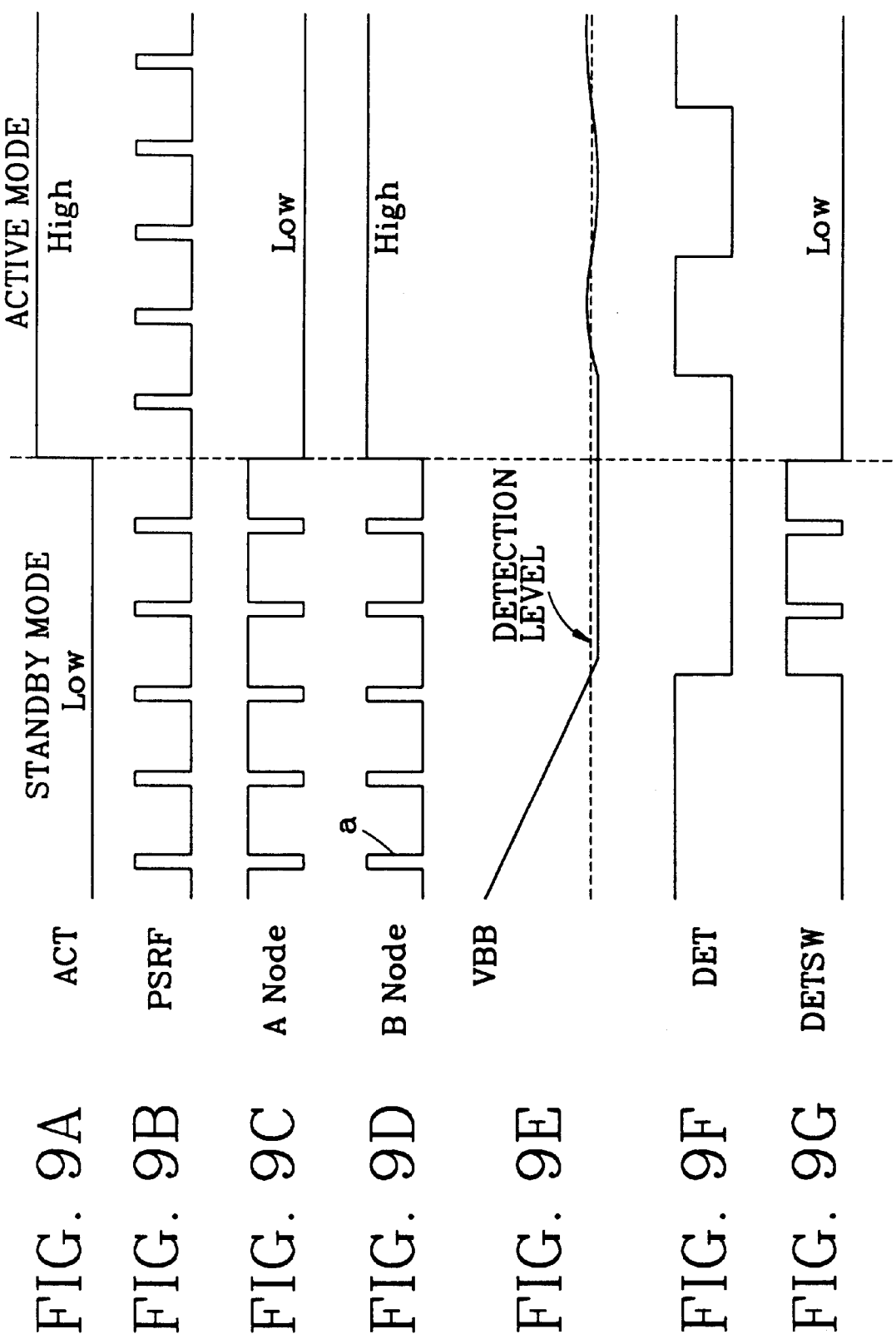

SUBSTRATE VOLTAGE DETECTION CONTROL CIRCUIT

BACKGROUND OF THE INVENTION

1. Field of the Invention

The present invention relates to a substrate voltage(Back Bias Voltage) detection control circuit, and in particular to an improved substrate voltage detection control circuit which is capable of separately operating substrate voltage detectors in accordance with an operation mode of chips.

2. Description of the Background Art

Generally, a substrate VBB is an important parameter for implementing a stable operation of a DRAM chip. For example, the substrate voltage VBB prevents a data loss of a memory cell or a latch-up by preventing a PN junction in a DRAM chip from being forward biased. In addition, the substrate voltage VBB decreases a threshold voltage variation of a MOS transistor based on a body effect and implements a stable circuit operation.

The substrate voltage VBB is generated by a substrate voltage generation circuit of the chip. The substrate voltage generation circuit generates a substrate voltage VBB of −2V through −3V based on a power voltage VCC of 5V and provides it to a P-well formed on a substrate.

FIG. 1 illustrates a known substrate voltage generation circuit which is formed of an oscillator 10, a charge pump 20, and a substrate voltage detector 30.

The oscillator 10 is a ring oscillator formed of an odd number of inverters. The charge pump 20 may be formed of two NMOS transistors connected with a diode, respectively. In addition, the substrate voltage detector 30 may be formed of a NMOS transistor having its gate grounded. The threshold voltage of the NMOS transistor becomes a detection level of the substrate voltage VBB.

The operation of the known substrate voltage generation circuit will be explained.

The charge pump 20 performs a pumping operation in accordance with an oscillation signal OSC from the oscillator 10 and outputs a substrate VBB, and the substrate voltage detector 30 compares the substrate voltage VBB from the charge pump 20 with a previously set detection level and outputs a detection signal DET.

The oscillator 10 drives the charge pump 20 when a high level detection signal DET is inputted from the substrate voltage detector 30 (if the substrate voltage is higher than the detection level as a result of the judgement) and then supplies a substrate voltage VBB. When a low level detection signal DET is inputted (when the substrate voltage is smaller than the detection level), the charge pump 20 is stopped.

The level of the substrate voltage VBB has a negative value by the electron supplied from the charge pump 20 by repeatedly performing the above-described operation, so that the substrate voltage VBB maintains a predetermined level.

Generally, the substrate voltage VBB is determined by a balance between the current(generated by electrons) of the substrate voltage generation circuit and the substrate current (generated by positive hole) Ibb. At this time, the source of the substrate Ibb is the NMOS transistor of the chip. The channel electrons are accelerated by a high electric field at the peripheral portions of the NMOS transistor for thereby generating an impact ionization phenomenon. As a result, the pairs of electron-positive holes are generated by the impact ionization. The thusly generated positive holes are introduced into the substrate for thereby forming a substrate voltage, so that the substrate voltage is increased in the + direction.

Therefore, when the chip is in the standby mode, since the NMOS transistor is not operated, the quantity the positive holes introduced into the substrate is small, and when the chip is in the active mode, a plurality of NMOS transistors in the chip are operated for thereby increasing the quantity of the positive holes. When the power voltage VCC is increased, the substrate current Ibb is sharply exponentially increased. In this case, since the period of the ring oscillator forming the oscillator 10 is one-dimensionally increased, when the power voltage VCC exceeds a predetermined level, the substrate current Ibb introduced into the substrate exceeds the current supply capacity of the substrate voltage generation circuit. Namely, the number of the positive holes introduced into the substrate by the impact ionization exceeds the number of the electrons supplied from the substrate voltage generation circuit to the substrate, so that the substrate voltage VBB is increased in the + direction.

When the substrate voltage VBB is increased in the + direction by the substrate current Ibb, the substrate voltage detector 30 detects the level of the substrate voltage VBB and operates the oscillator 10 and the charge pump 20 sequentially. As a result, the number of the electrons supplied to the substrate is increased, and the substrate voltage VBB is uniformly maintained. In addition, the above-described procedures are repeatedly performed during the operation of the chip, and the period of the repetition is determined by the amount of the current (substrate current) introduced into the substrate.

Therefore, in order to overcome the problem that the substrate voltage is increased by the substrate current, a method for increasing the driving capacity of the substrate voltage generation circuit is disclosed. However, in this case, the driving capacity in the active mode of the chip is also increased, so that the consumption of the current is increased.

In addition, in the substrate voltage generation circuit, the substrate voltage detector is always turned on, even when the reflash is performed, the current is used up like the standby mode.

When turning on the substrate voltage detector at every predetermined period (few $\mu$s) for decreasing the current consumption in the standby mode, it is impossible to sensitively react to the variation of the substrate voltage in the active mode. In addition, the charge pump is driven at every predetermined period(few $\mu$s) by the substrate voltage detector, so that the level of the substrate voltage is increased more than the set value.

SUMMARY OF THE INVENTION

Accordingly, it is an object of the present invention to provide a substrate voltage detection control circuit which overcomes the aforementioned problems encountered in the background art.

It is another object of the present invention to provide a substrate voltage detection control circuit which is capable of uniformly maintaining a substrate voltage.

It is another object of the present invention to provide a substrate voltage detection control circuit which is capable of separately controlling a substrate voltage detector in accordance with an operation mode of a chip.

It is another object of the present invention to provide a substrate voltage detection control circuit which is capable of decreasing the consumption of the current by turning on a substrate voltage detector at every predetermined period in the standby mode.

It is another object of the present invention to provide a substrate voltage detection control circuit which is capable of sensitively reacting to the variation of the substrate voltage by turning on a substrate voltage detector in the active mode.

To achieve the above objects, there is provided a substrate voltage detection control circuit according to a first embodiment of the present invention which includes a substrate voltage detector detecting a substrate voltage from a charge pump, and a control circuit separately operating the substrate voltage detector in accordance with an operation mode of a chip.

To achieve the above objects, there is provided a substrate voltage detection control circuit according to a second embodiment of the present invention which includes a substrate voltage detector detecting a substrate voltage from a charge pump, an operation mode judging unit judging an operation mode of a chip, and a substrate voltage detector controller receiving an output signal from the operation mode judging unit, a detection signal from the substrate voltage detector and a first signal having a predetermined period and generating a control signal of the substrate voltage detector.

To achieve the above objects, there is provided a substrate voltage detection control circuit according to a third embodiment of the present invention which includes a substrate voltage detector detecting a substrate voltage from a charge pump, an operation mode judging unit judging an operation mode of a chip, and a substrate voltage detector controller controlling an operation of the substrate voltage detector in accordance with an operation mode of the chip, the operation mode judging unit including a first NOR-gate NORing a plurality of bank active signals, and a first inverter inverting an output from the first NOR-gate, and the substrate voltage detector controller including a second NOR-gate NORing an operation mode judging signal and a one shot pulse signal, a second inverter inverting an output from the second NOR-gate, and a third NOR-gate NORing outputs from the second inverter and the substrate voltage detector.

In the present invention, the substrate voltage detector controller turns on the substrate voltage detector one time at a predetermined period in the standby mode and turns on the substrate voltage detector all the time in the active mode. If the substrate voltage becomes higher than the detection level in the standby mode, the substrate voltage detector is turned on all the time.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9A through 9G are wave form diagrams illustrating timing of each unit of FIG. 2.

DETAILED DESCRIPTION OF THE PREFERRED EMBODIMENTS

Figure 1:
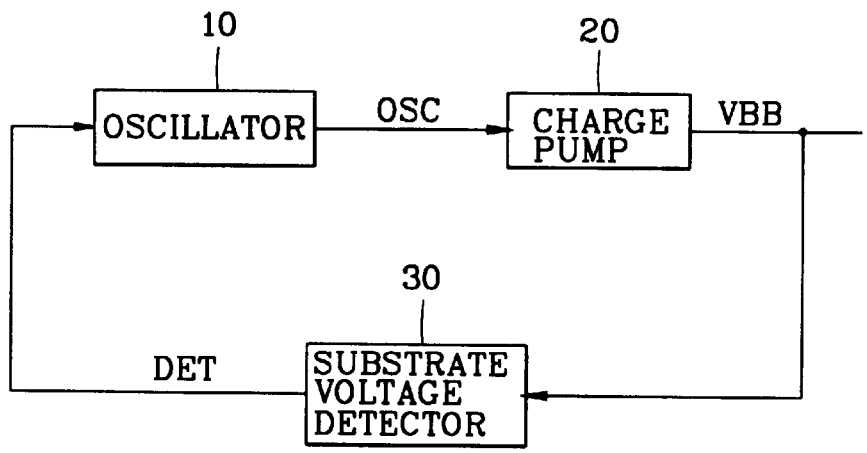
FIG. 1 is a block diagram illustrating a known substrate voltage generation circuit.
Figure 2:
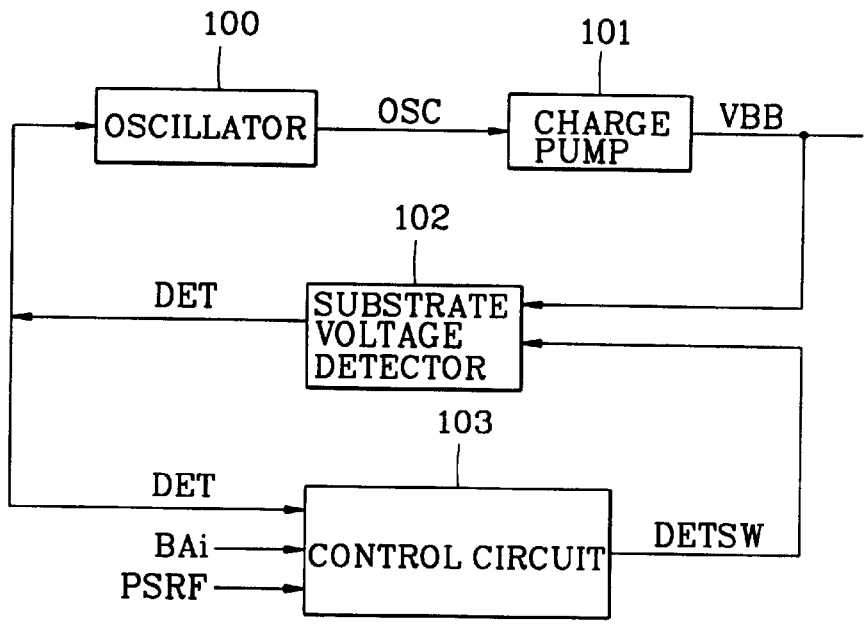
FIG. 2 is a block diagram illustrating a substrate voltage detection control circuit according to the present invention.

FIG. 2 illustrates the substrate voltage generation circuit according to the present invention which includes an oscillator 100, a charge pump 101, a substrate voltage detector 102, and a control circuit 103.

Figure 7:
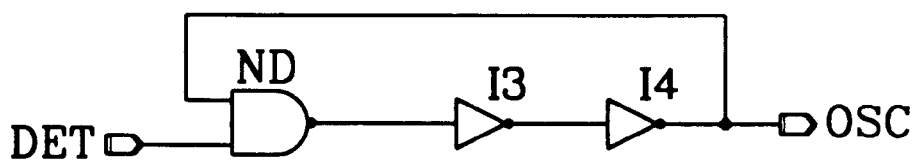
FIG. 7 is a view illustrating the oscillator of FIG. 2.

The oscillator 100 is formed of a ring oscillator including one NAND-gate ND and two inverters I1 and I2 as shown in FIG. 7. Generally, a known charge pump is used as the charge pump 101.

Figure 3:
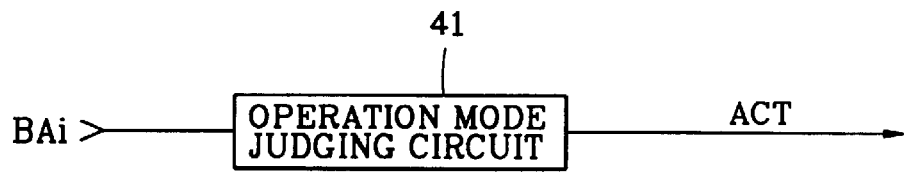
FIGS. 3 and 4 are block diagrams illustrating an operation mode judging unit and a substrate voltage detection controller of the control circuit of FIG. 2.
Figure 4:
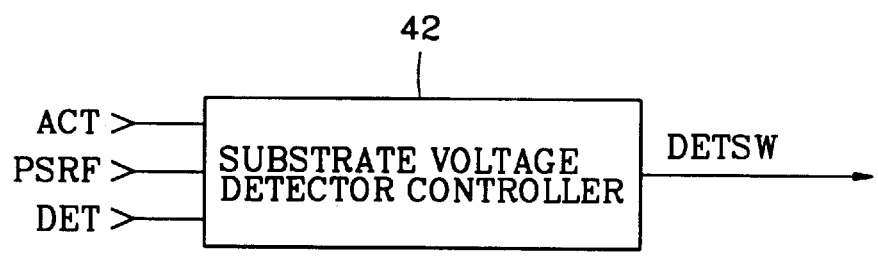

FIGS. 3 and 4 illustrate an operation mode judging unit 41 and a substrate voltage detector controller 42 forming a control circuit 103. The present invention is not limited to the above-described construction. Namely, the control circuit 103 may be formed of only the substrate voltage detector controller 42. In this case, in lieu of the operation mode judging signal ACT, the reflash signal may be used.

Figure 5:
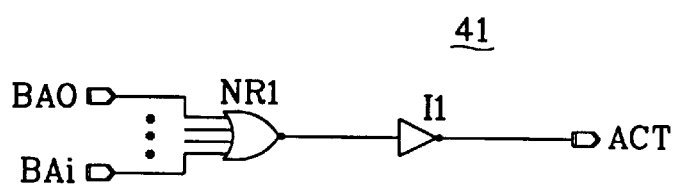
FIG. 5 is a view illustrating the operation mode judging unit of FIG. 3.

As shown in FIG. 5, the operation mode judging unit 4 includes a NOR-gate NR1 NORing a plurality of bank active signals BAi, i=0, . . . , n, and an inverter I1 inverting an output from the NOR-gate NR1 and outputting an operation mode judging signal ACT.

Figure 6:
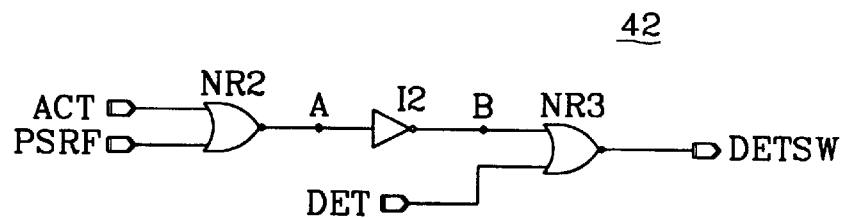
FIG. 6 is a view illustrating the substrate voltage detection controller of FIG. 4.

As shown in FIG. 6, the substrate voltage detector controller 42 includes a NOR-gate NR42 NORing an operation mode judging signal ACT from the operation mode judging unit 41 and an output signal PSRF from the reflash timer (not shown), an inverter I2 inverting an output from the NOR-gate NR2, and a NOR-gate NR3 for NORing an output from the inverter I2 and a detection signal DET from the substrate voltage detector 30 and outputting a detection control signal DETSW. The present invention is not limited to the above-described construction. in lieu of the output signal PSRF of the reflash timer (not shown), one short pulse having a predetermined period may be used.

Figure 8:
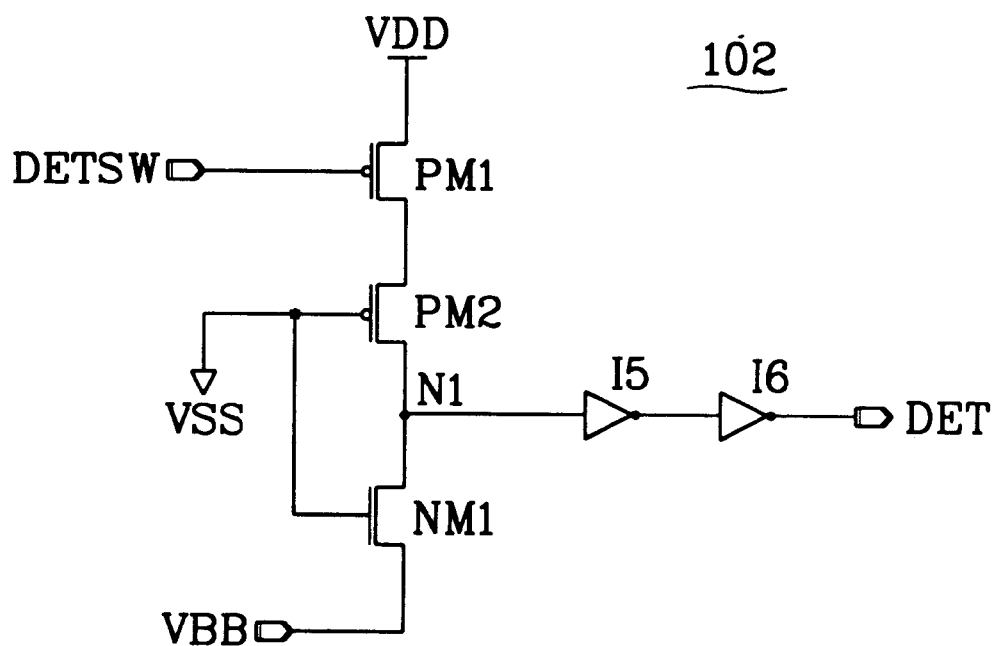
FIG. 8 is a view illustrating the substrate voltage detector of FIG. 2.

As shown in FIG. 8, the substrate voltage detector 102 includes PMS transistors PM1 and PM2 connected in series between the power voltage VDD terminal and the node N1, a NMOS transistor NM1 connected between the node N1 and the substrate VBB for detecting the substrate voltage VBB, and inverters I5 and I6 connected with the node N1, respectively. At this time, the gate of the PMS transistor PM1 receives a detection control signal DETSW, and the gates of the PMS transistor PM2 and the NMOS transistor NM1 are grounded.

The operation of the substrate voltage generation circuit according to the present invention will be explained with reference to the accompanying drawings.

The charge pump 101 in FIG. 2 performs a pumping operation in accordance with an oscillation signal OSC from the oscillator 100 and outputs a substrate voltage VBB. The substrate voltage detector 102 detects the levels of the substrate voltage VBB from the charge pump 101 in accordance with a detection control signal DETSW from the control circuit 103 and outputs a detection signal DET for controlling the oscillator 100. Therefore, the above-described procedures are repeatedly performed during the operation of the chips, so that a predetermined substrate voltage VBB is generated.

The operation of the substrate voltage detector 102 and the control circuit 103 will be explained.

The operation mode judging unit 41 of the control circuit 103 receives a plurality of bank active signals BAi, i=0, . . . n and judges the operation mode of the chip. Namely, in the standby mode, since the bank active signals BAi are all low level, as shown in FIG. 5, the operation mode judging unit 41 outputs a low level operation mode judging signal ACT through the inverter I1 and in the active mode, the same outputs a high level operation mode judging signal ACT because at least one bank active signal BAi is a high level.

In addition, the substrate voltage detector controller 42 receives an operation mode judging signal ACT, an output signal from a reflash timer (not shown) and a detection signal DET from the substrate voltage detector 102 and outputs a detection control signal DETSW for separately controlling the substrate voltage detector in the standby mode and active mode.

1. Standby Mode

In the standby mode, the operation mode judging unit 41 outputs a low level operation mode judging signal ACT as shown in FIG. 9A to the substrate voltage detector controller 42. Since the NOR-gate NR2 of the substrate voltage detector controller 42 is operated as an inverter by a low level operation mode judging signal ACT, at the nodes A and B, the output signals PSRF of the reflash timer (not shown) as shown in FIGS. 9C and 9D are outputted. The detection control signal DETSW becomes a low level at every pulse signal "a" as shown in FIG. 9D. Therefore, the PMOS transistor PM1 of the substrate voltage detector 102 as shown in FIG. 8 is turned on. Namely, the substrate voltage detector 102 is operated at every period of the reflash timer.

The substrate voltage detector 102 is operated at every period of the reflash timer, and the substrate voltage VBB from the charge pump 101 is compared with the previously set detection level. As a result of the comparison, if the substrate voltage VBB as shown in FIG. 9E is higher than the detection level, the high level detection signal DET as shown in FIG. 9F is outputted. If the substrate voltage VBB is lower than the detection level, the low level detection signal DET is outputted. At this time, the comparing operation between the substrate voltage VBB and the detection level is performed by the NMOS transistor NM1, and the detection level becomes a turn-on voltage of the NMOS transistor NM1.

As shown in FIG. 8, if the substrate voltage VBB is higher than the detection level, the NMOS transistor NM1 is turned off, and since the PMOS transistor PM1 is turned on by a low level detection control signal DETSW based on the first pulse signal "a" at the node B, a high level detection signal DET is outputted through the inverter I6. In addition, if the substrate voltage VBB is lower than the detection level, the NMOS transistor NM1 is turned on, and the detection signal DET is transited to the low level.

In the case that the substrate voltage VBB is higher than the detection level, the substrate voltage detector controller 42 turns on the substrate voltage detector 102 all the time for the reason that the detection control signal DETSW from the substrate voltage detector controller 42 is affected by the high level detection signal DET. Namely, when a high level detection signal DET is outputted from the substrate voltage detector 102, the detection control signal DETSW from the NOR-gate NR3 as shown in FIG. 9G becomes a low level irrespective of the level at the node B.

In the standby mode, the control circuit 103 turns on the substrate voltage detector 102 one time at every period of the reflash timer and detects the substrate voltage VBB. If the detected substrate voltage VBB is higher than the detection level, the control circuit 103 turns on the substrate voltage detector 102 all the time for thereby decreasing the substrate voltage VBB. The present invention is not limited to the output signal PSRF of the reflash timer. A one shot pulse signal having a predetermined period may be used.

2. Active Mode

In the active mode, the operation mode judging unit 41 outputs a high level operation mode judging signal ACT as shown in FIG. 9A. The substrate voltage detector controller 42 outputs a low level detection control signal DETSW in accordance with a high level operation mode judging signal ACT as shown in FIG. 9G irrespective of the output signal PSRF from the fresh timer and the level of the detection signal DET.

Namely, the levels at the nodes A and B as shown in FIG. 6 are low and high levels by the high level operation mode judging signal ACT, and the NOR-gate NR3 outputs a low level detection control signal DETSW in accordance with the level at the node B. Therefore, the substrate voltage detector 102 is turned on all the time by the low level detection control signal DETSW for thereby detecting the substrate voltage VBB.

In addition, the oscillator 100 drives the charge pump 101 when a high level detection signal DET is inputted from the substrate voltage detector 102 for thereby decreasing the substrate voltage, and when a low level detection signal DET is inputted, the charge pump 101 is stopped.

As described above, in the present invention, it is possible to uniformly maintain a substrate voltage by separately controlling each substrate voltage detector in the standby mode and the active mode.

In addition, it is possible to decrease the consumption of the current by turning on the substrate voltage detector one time at every predetermined interval in the standby mode, and to react to the variation of the substrate voltage by turning on the substrate voltage detector all the time in the active mode.

In the standby mode, if the substrate voltage is higher than the detection level, it is possible to react to the variation of the substrate voltage by turning the substrate voltage detector all the time.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A circuit, comprising:
    a voltage adjuster to control a substrate voltage applied to a substrate when enabled by a detection signal;
    a detector to detect whether the substrate voltage is within an acceptable range and to output the detection signal at a predetermined level to the voltage adjuster when enabled by a detection control signal and when the substrate voltage is outside of the acceptable range; and
    a control circuit to output the detection control signal to the detector, the level of which is based on a plurality of indicating signals indicating whether an external circuit formed on the substrate is in an active mode or a standby mode.

2. The circuit of claim 1, wherein the control circuit outputs the detection control signal at periodic level when the external circuit is in the standby mode and the substrate voltage is within the acceptable range, and wherein the control circuit continuously outputs the detection control signal at the predetermined level when the external circuit is in the active mode.

3. The circuit of claim 2, wherein the control circuit continuously outputs the detection control signal when the external circuit is in the standby mode and the substrate voltage is outside of the acceptable range.

4. The circuit of claim 1, wherein the voltage adjuster includes:

an oscillator connected to the detector to output an oscillation signal when the detection signal is received; and a charge pump connected to the oscillator to control the substrate voltage when the oscillation signal is received.

5. The circuit of claim 1, wherein the control circuit includes:

adjudging circuit to output an intermediate signal by logically combining the plurality of indicating signals; and a controller connected to the judging circuit to output the detection control signal from inputs of the intermediate signal, the detection signal, and a periodic signal.

6. The circuit of claim 5, wherein the intermediate signal from the judging circuit reflects that the external circuit is in the standby mode when all of the indicating signals are low, and reflects that the external circuit is in the active mode when at least one of the indicating signals is high.

7. The circuit of claim 5, wherein the controller includes:

at least one logical element to logically combine the intermediate signal and the periodic signal to produce a second intermediate signal; and at least one other logical element to logically combine the second intermediate signal and the periodic signal to produce the detection control signal.

8. The circuit of claim 1, wherein the detector includes:

first and second PMOS transistors connected in series between a power voltage and a node, a gate of the first PMOS transistor being connected to the detection control signal, and a gate of the second PMOS transistor being connected to ground; and an NMOS transistor connected between the node and the substrate voltage, a gate of the NMOS transistor being connected to ground, wherein the detection signal is derived from the node.

9. A circuit, comprising:

a voltage adjuster to control a substrate voltage applied to a substrate when enabled by a detection signal;

a detector to detect whether the substrate voltage is lower than a threshold value and to output the detection signal at a predetermined level to the voltage adjuster when enabled by a detection control signal and when the substrate voltage is above the threshold value; and a controller to output the detection control signal to the detector, the level of which is based on inputs of a periodic signal, the detection signal, and a mode signal indicating whether an external circuit formed on the substrate is in an active mode or a standby mode.

10. The circuit of claim 9, further comprising:

a judging circuit to output the mode signal by logically combining a plurality of signals from the external circuit.

11. The circuit of claim 9, wherein the controller outputs the detection control signal at a periodic level when the mode signal indicates that the external circuit is in the standby mode and the substrate voltage is lower than the threshold value, and wherein the controller continuously outputs the detection control signal at a predetermined level when the external circuit is in the active mode.

12. The circuit of claim 11, wherein the controller continuously outputs the detection control signal at the predetermined level when the external circuit is in the standby mode and the substrate voltage is above the threshold value.

* * * * *